United States Patent [19]

Winzer

[11] Patent Number: 4,718,055

[45] Date of Patent: Jan. 5, 1988

[54] WAVE-DIVISION MULTIPLEX COMPONENT FOR AN OPTICAL NETWORK COMPRISING MONOMODE TRANSMISSION FIBERS

[75] Inventor: Gerhard Winzer, Putzbrunn, Fed. Rep. of Germany

[73] Assignee: Siemens Aktiengesellschaft, Berlin and Munich, Fed. Rep. of Germany

[21] Appl. No.: 898,194

[22] Filed: Aug. 20, 1986

[30] Foreign Application Priority Data

Sep. 17, 1985 [DE] Fed. Rep. of Germany ....... 3533148

[51] Int. Cl.[4] .............................................. H04B 9/00
[52] U.S. Cl. .................................... 370/3; 350/96.16; 350/96.18
[58] Field of Search ............... 370/3; 350/96.15, 96.16, 350/96.18, 96.19, 96.20

[56] References Cited

FOREIGN PATENT DOCUMENTS 60-216315  10/1985  Japan ................................ 350/96.16

OTHER PUBLICATIONS

G. Winzer, "Wavelength Multiplexing Components—A Review of Single-Mode Devices and Their Applications", *IEEE Journal of Lightwave Technology*, vol. LT-2, No. 4, Aug. 1984, pp. 369-378.

*Primary Examiner*—Joseph A. Orsino, Jr.
*Attorney, Agent, or Firm*—Hill, Van Santen, Steadman & Simpson

[57] ABSTRACT

A wavelength-division multiplex component for an optical broadband ISDN network with monomode transmission fibers is an uncomplicated component for bi-directional optical wavelength-divison multiplex transmission composed of a rod lens, a wavelength selective filter planarly applied to a front surface of the rod lens, and a plug member surrounding the rod lens and the filter. Monomode and multimode light waveguides are held in the plug member and are butt-coupled to a back surface of the rod lens. The monomode light waveguide fiber is preferably aligned to the optical axis of the rod lens and the front end face of the rod lens is preferably inclined slightly relative to the optical axis so that the multimode light waveguide, which extends parallel to the monomode light waveguide, can be offset laterally therefrom.

18 Claims, 7 Drawing Figures

WAVE-DIVISION MULTIPLEX COMPONENT FOR AN OPTICAL NETWORK COMPRISING MONOMODE TRANSMISSION FIBERS

BACKGROUND OF THE INVENTION

The present invention is directed to a wavelength-division multiplex component for an optical communication transmission network operated with various wavelengths and comprising a monomode transmission fiber, in particular for a broadband ISDN network.

Components of this type are known, for example, as disclosed in an article by G. Winzer, "Wavelength Multiplexing Components—A Review of Single-Mode Devices and Their Applications", *IEEE J. Lightwave Techn.*, Vol. LT-2/4, 1984, pages 369–378.

SUMMARY OF THE INVENTION

The object of the present invention is to provide an involved component for use in the wavelength-division multiplex, which component is manufacturable with little manufacturing outlay, which component is adjustment-insensitive during installation and which component can be subsequently provided in a light waveguide plug without a wavelength-division multiplex.

To obtain these objects, the present invention is directed to a wavelength-division multiplex component for an optical communication transmission network operated with various wavelengths, said network including monomode transmission fibers, in particular for a broadband ISDN network. The component includes an optical lens having a front surface and a back surface, a wavelength selective filter being arranged at the front surface of the lens, a plug member surrounding the lens and the filter and being acceptable in a plug socket, said filter being transmissive to one wavelength and being covered at a front surface in the plug member with a material which is transparent for this one wavelength, said filter reflecting light of a second wavelength, a multimode light waveguide and a monomode light waveguide, means holding the monomode and multimode light waveguides in the plug member at a back surface of the lens with the ends of the waveguides being positioned so that light of the second wavelength leaving the end of the monomode light waveguide and reflected by the filter is focussed by the lens into the lens-proximate end of the multimode light waveguide for coupling therein, a lens distal end of the monomode light waveguide being coupled to a transmission fiber and a lens distal end of the multimode light waveguide being coupled to an optical detector.

The component of the invention is particularly suited for employment in an optical broadband integrated service digital network or ISDN network comprising monomode transmission fibers. It can be employed in a particularly uninvolved way and marginally in combination with any transmission module which comprises a coupling flange for lens plugs. It can be inexpensively manufactured. Over and above this, an installed transmission length can be brought into the bi-directional operating mode without other significant modifications by inserting the component with its modular structure, insofar as the transmission module already comprises a lens plug. The advantages of the modular structure of the component of the invention is not only directed to the uninvolved structural design. A special feature is that given an outage, for example, of a transmission diode, the entire wavelength-division multiplex module including transmitting receiver need not be thrown out as or in the previous devices but only the inoperative sub-component needs to be replaced. In manufacture, the modular structure correspondingly leads to an increase of the yield.

Viewed in and of itself, the multiplex component or, respectively, WDM component of the invention is merely a fragment in comparison to the components known from the above mentioned reference. This fragment without respect to the overall function manages without a specific beam shaping in the transmission mode. However, it can be advantageously simply adapted to certain prescribed beam shapes of the transmission module within broad limits.

A preferred development of the component of the invention is designed wherein the optical lens is a rod lens and the wave selective filter is applied on a planar front surface of the rod lens.

An advantageous development of the component is that the means for holding the monomode light waveguide holds the monomode light waveguide on an optical axis of the rod lens and the lens-proximate end section of the multimode light waveguide is held parallel thereto and the front end face of the rod lens is inclined slightly relative to the axis so that the focussed second wavelength is offset from the axis of the lens. This advantageous component can operate in combination with conventional laser modules which comprise a plug receptacle having a coupling lens from which the light emitted by a laser diode emerges as a parallel beam in the direction of the axis of the socket. Given a plug part inserted into this laser module, the axis of the lens of the component coincides with the axis of the lens associated with the laser diode. The parallel beams are focussed on the axis on a back surface of the rod lens of the component. The lens-proximate ends of the monomode light waveguide is to be arranged at the location of the focus so that the light is coupled into this light waveguide. The slightly oblique position of a front end face or surface insures that the light having a second wavelength emerging from the end of the monomode light waveguide is reflected by the filter and focussed by the rod-shaped lens to be laterally spaced from the end of the monomode light waveguide. The lens-proximate end of the multimode light waveguide is thus, arranged at this focal point or at least in the proximity thereof so that the light is coupled into this multimode waveguide.

The angle of inclination of the front end face of the rod lens from a plane perpendicular to the axis should be selected as small as possible in order to achieve a polarization independent filtering effect. Its lower limit is established by the minimum spacing between the axes of the two light waveguides.

A component having the rod-shaped lens and with the monomode light waveguide being aligned on the optical axis of the rod-shaped lens is expediently fashioned wherein the rod-shaped lens comprises a length on the axis where at the light incident parallel to the axis is essentially focussed onto the end face of the rod-shaped lens and in that the two light waveguides are butt-coupled to the back surface of the rod-shaped lens.

At the front side or surface, the plug member of the component of the invention must allow the unimpeded light passage for the light emitted by the laser module. This filter is transmissive for this light from the laser and passes in one wavelength to the lens. In the first arrangement of the component of the invention, the plug member is composed of a plastic material transparent to the first or one wavelength and surrounds the lens with the filter as well as both of the light waveguides together with a mount as a cast part. In a second embodiment, the component is fashioned with the plug member being composed of a hollow, cylindrical metal member in which the lens with the filter and the two light waveguides together with the means for mounting are accepted. This member is closed at the front end with a transparent member selected from a group consisting of a plastic material and a glass lamina. After closing with the plastic material or the glass lamina, the front end surface of this metal tube as well as the insert is polished.

The means for positioning the two light waveguides is expediently composed of a carrier member which is secured in the plug member and the light waveguides are then fixed on this carrier member. In one embodiment, the two light waveguides are composed of fibers and the carrier member is provided with a guide channel for receiving the two fibers. In another embodiment, the multimode light waveguide is formed integrated in the carrier member. Thus, the carrier member can be, preferably, composed of glass in which the integrated waveguide is a waveguide produced by means of ion exchange. It is also expedient when the integrated waveguide comprising a curvature which merges into a lens distal end section proceeding perpendicular to the axis of the lens. In this case, the optical detector is expediently directly coupled to the lens distal end of the integrated waveguide. In any case in which the multimode waveguide is an integrated waveguide, the monomode light waveguide is, preferably, composed of a fiber which is fixed in a guide channel of the carrier member.

Other advantages and features of the invention will be readily apparent from the drawings and the following specification and claims.

DESCRIPTION OF THE PREFERRED EMBODIMENTS

Figure 1:
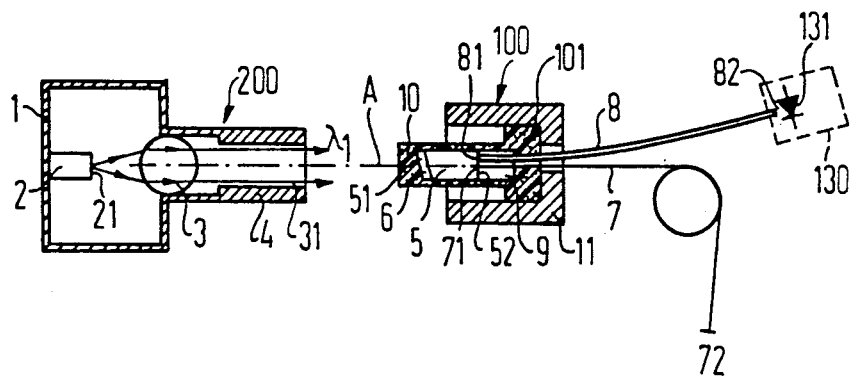
FIG. 1 is an exploded longitudinal cross sectional view with portions in elevation of a laser module utilizing the component of the present invention.

The principles of the present invention are particularly useful in a component generally indicated at 100 in FIG. 1. The component 100 is illustrated as being used with a laser module generally indicated at 200. The module 200 is composed of a housing 1 for a laser diode 2 having a light exit surface 21. The housing 1 has a plug socket 4. A coupling lens 3 in the form of a spherical lens is arranged in the plug socket 4. The spherical lens can be a rod lens. What is meant by a rod lens is a rod of transparent material which comprises a radial refractive index profile in the form of a gradient profile so that it acts as an optical lens, such rod lenses are conventional and known.

The coupling lens 3 is dimensioned and arranged at a distance from the light exit surface 21 of the laser diode 2 which is secured in the housing so that parallel beams 31 having a wavelength $\lambda 1$, which are emitted by the laser diode will emerge from this lens 3 and thus, from the plug socket 4.

In terms of significant parts, the component 100 itself is composed of a rod lens 5, an interference filter 6 applied planarly to a front end surface 51 for the separation of two operating wavelengths $\lambda 1$ and $\lambda 2$. In addition, the component includes a transparent plug member 10, which is dimensioned with a diameter so that it can be plugged into the plug socket 4. The plug member 10 enables a low-loss coupling into the component and also protects the filter 6. The two optical fibers 7 and 8 are coupled to a back end surface 52 of the rod lens 5. The optical fiber 7 is a monomode fiber which forms a pig-tail to a line fiber and is aligned to be on an optical axis A of the rod lens 5 which in the plug-in condition of the module 200 and the component 100 coincides with the optical axis A of the lens 3. The fiber 8, which is a multimode fiber, serves as an outcoupling fiber and proceeds parallel to the axis A, and it terminates in the end 82 which leads to a photodiode 131 of a receiver module 130 which can be arranged within the component as needed. The employment of a thick core fiber, for example, a stepped profile fiber, which has a 50 um core diameter, is expedient for employment as the fiber 8. On the other hand, the diameter should be selected as large as possible in order to simplify coupling to the lens 5. However, it is limited to about 50 $\mu m$ due to the reception area of the photodiode 131 and also because of the required polarization-independent filter effect. It also cannot be selected any larger because of the minimum spacing between the fiber axes which is to be correspondingly required.

On the axis A, the rod lens 5 has a $\frac{1}{4}$ pitch length so that the light of the wavelength $\lambda 1$ incident parallel to the axis proceeds from the front surface and is focussed on the back end surface 52 on the axis A. It is noted, that the filter 6 is transmissive to light of the one wavelength $\lambda 1$ and reflectors for light of the second wavelength $\lambda 2$. The lens 5 is obliquely ground on a front surface so that its front end face or surface 51 describes a small angle $\alpha$ with a plane extending perpendicular to the axis A and as a result thereof, the lens comprises an overall length respectively under length outside of the axis A. The interference filter 6 is a wavelength-selective filter and is applied surface wide to the oblique, front end surface 51. This filter, for example as mentioned above, is potentially an interference filter. For bi-directional transmission mode, two components which differ in terms of the filter are to be provided. The different filters must be complementary to one another so that one filter is precisely transmissive for the wavelength for which the other filter is opaque or vice versa. Complementary filters can be manufactured in the form of interference filters.

For a polarization-independent filter effect, the angle $\alpha$ should be selected as small as possible. The lower limits are defined by the lateral spacing of the two waveguides 7 and 8. When, for example, the waveguides 7 and 8 are fibers which are fixed in guide channels of a carrier member 9, the minimum angle α is defined from the minimum web width between the guide channels in the carrier member 9 and is defined by the outside diameter of the fibers. The component is advantageously insensitive to rotation of the two lenses relative to one another around their common axis A. This occurs because the light waveguide 7, which leads to a line fiber, lies on the axis A and only light waveguide 8 serving for outcoupling describes a circle around this axis together with the photodetector 131, which are rigidly connected to the lens distal end 82 of the multimode fiber 8. When the plug is turned, thus, the transmitter diode 2 and the monomode light waveguide 7 remain adjusted relative to one another.

At its front surface, the plug member 10 must enable the unimpeded light passage from the laser module 200 to the lens 5. Given the embodiment of FIG. 1, the plug member 10 is composed of a plastic material transparent for the one wavelength λ1, for example, an epoxy resin which surrounds the filter 6, the lens 5 and the carrier member 9 for the light waveguides 7 and 8 as a cast part. Its outside diameter can be brought to the desired dimension by being turned in a centering or turning device. It is preferably secured in a spigut nut 11 which is thrust over the plug socket 4 when plugging the member 10 into the socket 14.

Figure 2:
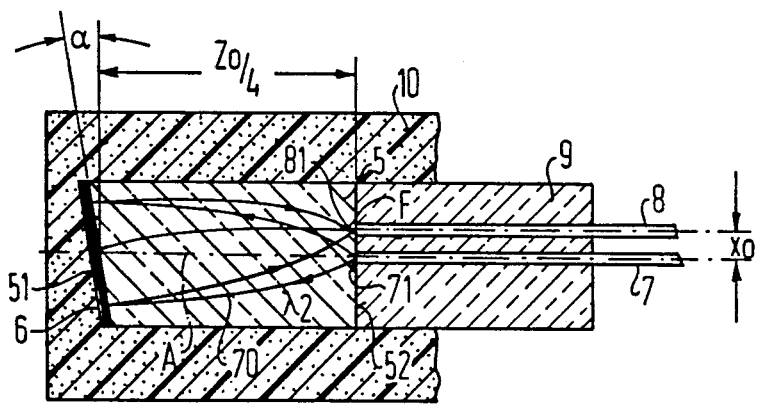
FIG. 2 is an enlarged cross sectional view of a part of the component of FIG. 1.

The component 100 of FIG. 1 is shown again in terms of its essential parts in a larger view in FIG. 2 with a back part 101 of the plug member 10, which has an expanded diameter, not being shown. The beam path in the lens 5 of the light of the other wavelength λ2 which is reflected by a filter 6 and emerges from the lens-proximate end 71 of the monomode fiber 7 is shown in FIG. 2. This light emerges from the end 71 as a divergent beam 70 and is gradually focussed to form a parallel beam on its path through the lens 5. This parallel beam is reflected at the filter 6, which is arranged at a slant relative to the axis A, and upon return through the lens, the light is focussed in a point F close the back end surface 52. As a consequence of the oblique positioning of the filter 6, this point lies at a lateral distance $X_0$ from the axis A of the lens and from the waveguide 7. The multimode fiber 8 extends parallel to the axis A and is arranged at this distance $X_0$ from the axis A so that its lens-proximate end 81 lies close and opposite the point F. What is thereby achieved is that the light having the wavelength λ2 which is concentrated at this point F is coupled to the multimode fiber 8.

Figure 3:
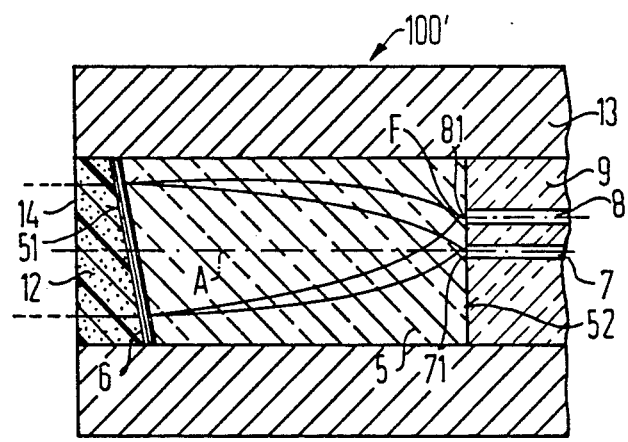
FIG. 3 is an enlarged cross sectional view similar to FIG. 2 of an embodiment of the component of the invention.
Figure 4:
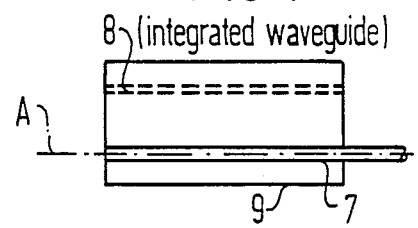
FIG. 4 a plan view of a carrier member with an integrated waveguide.
Figure 5:
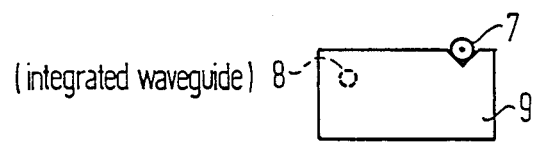
FIG. 5 a front view of a carrier member with an integrated waveguide generated by means of ion exchange.
Figure 6:
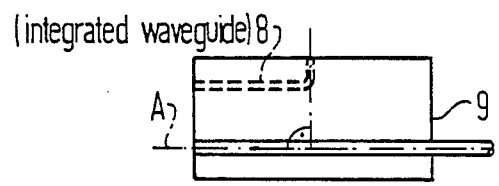
FIG. 6 a plan view of a carrier member having an integrated waveguide having a curvature which merges into lens section proceeding perpendicularly to an optical axis of a lens.
Figure 7:
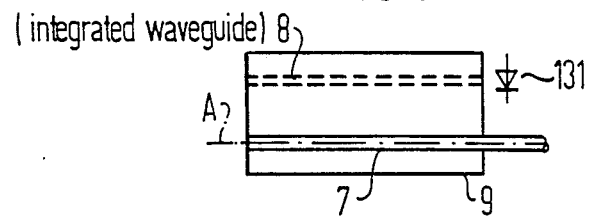
FIG. 7 a plan view of a carrier member having an integrated waveguide and a detector directly coupled to said waveguide.

An embodiment of the component is generally indicated at 100' in FIG. 3. The embodiment 100' is similar to the embodiment 100. The difference is that the plug member 10 of the embodiment 100 is not composed of a single piece but is formed by a tubular metal member 13 in which the lens 5 with the filter 6 and the two fibers 7 and 8 together with the mount or carrier 9 are accepted. The tube 13 has its front end closed by a transparent member 12 that extends to a front surface of the filter 6. For example, the member 12 can be composed of a transparent plastic material which is polished flat together with the end of the metal tube 13 to provide a front end face 14. The member 12 can also be composed of a wedge-shaped glass lamina which is glued to the filter 6 which is attached to the lens 5 before the introduction of the filter and lens into the metal tube 13.

When the receiver module 130 with the photodiode 131 is to be directly accommodated on the component, then it is expedient to modify the carrier member 9 in comparison to the embodiment shown in the FIGS. For example, the carrier member 9 now only contains a single axial guide channel for the monomode fiber 7 which leads to the line fiber. The guide channel with the multimode fiber is replaced by a waveguide integrated into the carrier member 9. For example, if the carrier member 9 is a glass member, a suitable waveguide is generated by an ion exchange which directs the light modulated with the received signal into the directly coupled receiver diode 131. The integrated waveguide can be curved to deflect the light of wavelength λ2 perpendicular to the axial direction of the fiber 7.

Although various minor modifications may be suggested by those versed in the art, it should be understood that I wish to embody with the scope of the patent granted hereon, all such modifications as reasonably and properly come within the scope of my contribution to the art.

I claim:

1. A component for a wave-division multiplex and for optical communications transmission networks operating with various wavelengths, said network including monomode transmission fibers such as used for broadband ISDN networks, said component including an optical lens having a front surface and a back surface, a wavelength-selective filter being arranged adjacent the front surface of said lens, a plug member surrounding the lens and the filter and acceptable in a plug socket, said filter being transmissive for light of at least one wavelength, said plug member having a portion covering the filter and being of a material which is transparent for said one wavelength, means for mounting a monomode light waveguide and a multimode light waveguide in said plug member with the ends of said light waveguides being adjacent the back surface of the lens and facing the lens so that light having a second wavelength emerging from the monomode light waveguide passes through the lens to be reflected by said filter and focussed by the lens at a point adjacent the lens-proximate end of the multimode light waveguide, said multimode light waveguide being coupled to an optical detector and the monomode light waveguide being coupled at its lens distal end to a transmission fiber.

2. A component according to claim 1, wherein the optical lens is composed of a rod lens and the wavelength selective filter is a planar filter applied to a front surface of said rod lens.

3. A component according to claim 2, wherein the lens-proximate end section of the monomode light waveguide is aligned on an optical axis of the rod lens and the lens-proximate end section of the multimode light waveguide proceeds parallel thereto, and the front end surface of said rod lens is slightly inclined relative to said optical axis.

4. A component according to claim 3, wherein the rod lens comprises a length on said optical axis wherein a light incident parallel to the axis is essentially focussed onto the end face of the rod lens and the two light waveguides are butt-coupled to said rod lens.

5. A component according to claim 2, wherein the rod lens comprises a length on an optical axis so that a light incident parallel to the axis is essentially focussed onto an end face of said rod lens and the two light waveguides are butt-coupled to said rod lens.

6. A component according to claim 1, wherein the plug member is composed of a plastic material transparent to the one wavelength, said plastic material surrounding the lens with the filter and the means for mounting both of said light waveguides, said plastic material being a cast part.

7. A component according to claim 6, wherein the plastic material on the front surface of the plug member is polished.

8. A component according to claim 1, wherein the plug member is composed of a hollow cylindrical metal member in which the lens with the filter and the means for mounting both the light waveguides together with their proximal ends are received, said metal member being closed on a front surface with a transparent member selected from a group consisting of plastic material and glass lamina.

9. A component according to claim 8, wherein the transparent member on the front surface of the plug member is polished.

10. A component according to claim 1, wherein the means for mounting both said light waveguides is composed of a carrier member secured in the plug member, said light waveguides being fixed on said carrier member.

11. A component according to claim 10, wherein both said light waveguides are composed of fibers and said carrier member includes a guide channel for each of said fibers.

12. A component according to claim 10, wherein said multimode light waveguide is a waveguide integrated into said carrier member.

13. A component according to claim 12, wherein said carrier member is composed of glass and said integrated waveguide is a waveguide generated by means of ion exchange.

14. A component according to claim 13, wherein said integrated waveguide has a curved distal end section which merges into a lens and proceeds perpendicular to an optical axis of said lens.

15. A component according to claim 14, wherein said optical detector is coupled directly to said lens distal end of the integrated waveguide.

16. A component according to claim 13, wherein said monomode light waveguide is composed of a fiber and said carrier member has a guide channel for receiving said fiber.

17. A component according to claim 12, wherein the integrated waveguide comprises a curved distal end section which merges into a lens and proceeds perpendicular to an optical axis of said lens.

18. A component according to claim 17, wherein said optical detector is coupled directly to said lens distal end of said integrated waveguide.

* * * * *